US008145660B2

(12) United States Patent
Marvit et al.

(10) Patent No.: US 8,145,660 B2
(45) Date of Patent: Mar. 27, 2012

(54) IMPLEMENTING AN EXPANDED SEARCH AND PROVIDING EXPANDED SEARCH RESULTS

(75) Inventors: David L. Marvit, San Francisco, CA (US); Rajalakshmi Balakrishnan, San Jose, CA (US); Hitoshi Matsumoto, San Jose, CA (US); Albert Reinhardt, Albany, CA (US); Kenji Nagahashi, Fremont, CA (US)

(73) Assignee: Fujitsu Limited, Kawasaki (JP)

( * ) Notice: Subject to any disclaimer, the term of this patent is extended or adjusted under 35 U.S.C. 154(b) by 501 days.

(21) Appl. No.: 12/243,330

(22) Filed: Oct. 1, 2008

(65) Prior Publication Data

US 2009/0094234 A1   Apr. 9, 2009

Related U.S. Application Data

(60) Provisional application No. 60/977,977, filed on Oct. 5, 2007.

(51) Int. Cl.
*G06F 17/30* (2006.01)

(52) U.S. Cl. ...................................................... 707/765

(58) Field of Classification Search .................. 707/765
See application file for complete search history.

(56) References Cited

U.S. PATENT DOCUMENTS

| 6,038,560 | A | 3/2000 | Wical | |
|---|---|---|---|---|
| 7,584,179 | B2 * | 9/2009 | Finley et al. .......................... | 1/1 |
| 7,593,929 | B2 * | 9/2009 | Dettinger et al. ..................... | 1/1 |
| 7,707,220 | B2 * | 4/2010 | Bonabeau et al. ............ | 707/758 |
| 2005/0080776 | A1 * | 4/2005 | Colledge et al. ................. | 707/3 |
| 2006/0106793 | A1 | 5/2006 | Liang | |
| 2006/0117002 | A1 | 6/2006 | Swen | |
| 2007/0192293 | A1 | 8/2007 | Swen | |

FOREIGN PATENT DOCUMENTS

| CN | 1216255 A | 4/2006 |
|---|---|---|
| EP | 1 612 704 A1 | 4/2006 |
| JP | 2005301889 | 10/2005 |
| JP | 2006113733 | 4/2006 |
| WO | WO 2007/025130 | 3/2007 |

OTHER PUBLICATIONS

EPO Search Report, Reference No. P111736EP01/CLH, Application No. 08165872.6-1225, 9 pages, Mar. 4, 2009.
The State Intellectual Property Office of China, Filing No. 200810166185.8, 21 pages, May 11, 2010.
The State Intellectual Property Office of China, Filing No. 200810166185.8, 8 pages, Jun. 28, 2010.
First Notification of Office Action in Chinese Application No. 200810166183.9, dated Sep. 13, 2010 with English translation, 17 pages, Sep. 13, 2010.
Chinese Office Action, Application No. 200810166183.9, with English Translation, 14 pages, Feb. 24, 2011.

(Continued)

*Primary Examiner* — Hung Q Pham
(74) *Attorney, Agent, or Firm* — Baker Botts L.L.P.

(57) ABSTRACT

Implementing an expanded search and providing expanded search results comprises receiving a search query generated by a user. A type of expansion to apply to the search query is determined. Expanded search queries are automatically generated according to the determined expansion type without intervention from the user. A search is executed on each one of the expanded search queries to retrieve search results, and the search results are provided for presentation to the user in modules. A module comprises search results for one of the expanded search queries.

23 Claims, 6 Drawing Sheets

OTHER PUBLICATIONS

Chinese Office Action, Application No. 200810166185.8, with English Translation, 25 pages, Mar. 16, 2011.

Clusty > About, "About; Who we are," http://clusty.com, 2 pages, 2009.

Notess, "Northern Light: New Search Engine for the Web and Full-Text Articles," Database, Online Inc., http://notess.com/write/archive/9802a.html, 6 pages, 1998.

"Query expansion," The Free Online Dictionary of Computing, http://burks.brigton.ac.uk/burks/foldoc/51/95.htm, 1 page, Aug. 27, 1999.

Efthimiadis, "Query Expansion," Information School; University of Washington, http://faculty.washington.edu/efthimis/pubs/Pubs/qe-arist/QE-arist.html, 51 pages, Apr. 14, 2000.

Grossman et al., "IIT Intranet Mediator: Bringing Data Together on a Corporate Intranet," IT Professional, IEEE, Vo. 4, No. 1, pp. 49-54, Jan. 1, 2002.

Kaki et al., "Findex: improving search result use through automatic filtering categories," Interacting with Computers, vol. 17, No. 1, pp. 187-206, Mar. 1, 2005.

Lopez et al., "Finder and Reader of Web Pages in Spanish for People with Visual Disadvantages," Univerdsidad de las Americas, Puebla, IEEE, 4 pages, Feb. 2006.

"Relevance feedback," Wikipedia, http://en.wikipedia.org/wiki/Relevance_feedback, 2 pages, Aug. 7, 2008.

U.S. Appl. No. 12/243,265, by inventors Albert Reinhardt et al., entitled "Intelligently Sorted Search Results," 25 pages, Oct. 1, 2008.

U.S. Appl. No. 12/243,381, by inventors David L. Marvit et al., entitled "Implementing an Expanded Search and Providing Expanded Search Results," 41 pages, Oct. 1, 2008.

EPO Communication, Reference No. P111725EP00/CLH, Application No. 08165832.0-1225, 7 pages, Feb. 6, 2009.

EPO Communication, Reference No. P111736EP00/CLH, Application No. 08165860.1-1225, 9 pages, Feb. 9, 2009.

Chinese Office Action, Application No. 200810166183.9, with English Translation, 18 pages, May 25, 2011.

Chinese Office Action, English translation, Application No. 200810166184.3, 4 pages. Dec. 9, 2011.

Japanese Office Action, English translation; Application No. 2008-259626; pp. 6. Nov. 22, 2011.

* cited by examiner

IMPLEMENTING AN EXPANDED SEARCH AND PROVIDING EXPANDED SEARCH RESULTS

RELATED APPLICATION

This patent application claims priority from Patent Application Ser. No. 60/977,977, filed Oct. 5, 2007, entitled EXPANDED SEARCHING.

TECHNICAL FIELD

This invention relates generally to searching information and providing search results, and more specifically, to implementing an expanded search and providing expanded search results.

BACKGROUND

A user may search through a collection of data for specific information, such as when performing a search on the World Wide Web ("Web") or a search of any other collection of documents or other forms of information. Searching information is usually an iterative process that is inefficient. Users enter a search query, receive a series of rank-ordered results, evaluate the results, and based upon an improved understanding of the different areas affiliated with the search and/or an improved familiarity with the subtleties of the subject, add terms to the search query in an effort to refine the search results. This process often repeats for several cycles, which creates inefficiencies in the search process.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Overview

In one embodiment, implementing an expanded search and providing expanded search results comprises receiving a search query generated by a user. A type of expansion to apply to the search query is determined. Expanded search queries are automatically generated according to the determined expansion type without intervention from the user. A search is executed on each one of the expanded search queries to retrieve search results, and the search results are provided for presentation to the user in modules. A module comprises search results for one of the expanded search queries.

Example Embodiments

Figure 1:
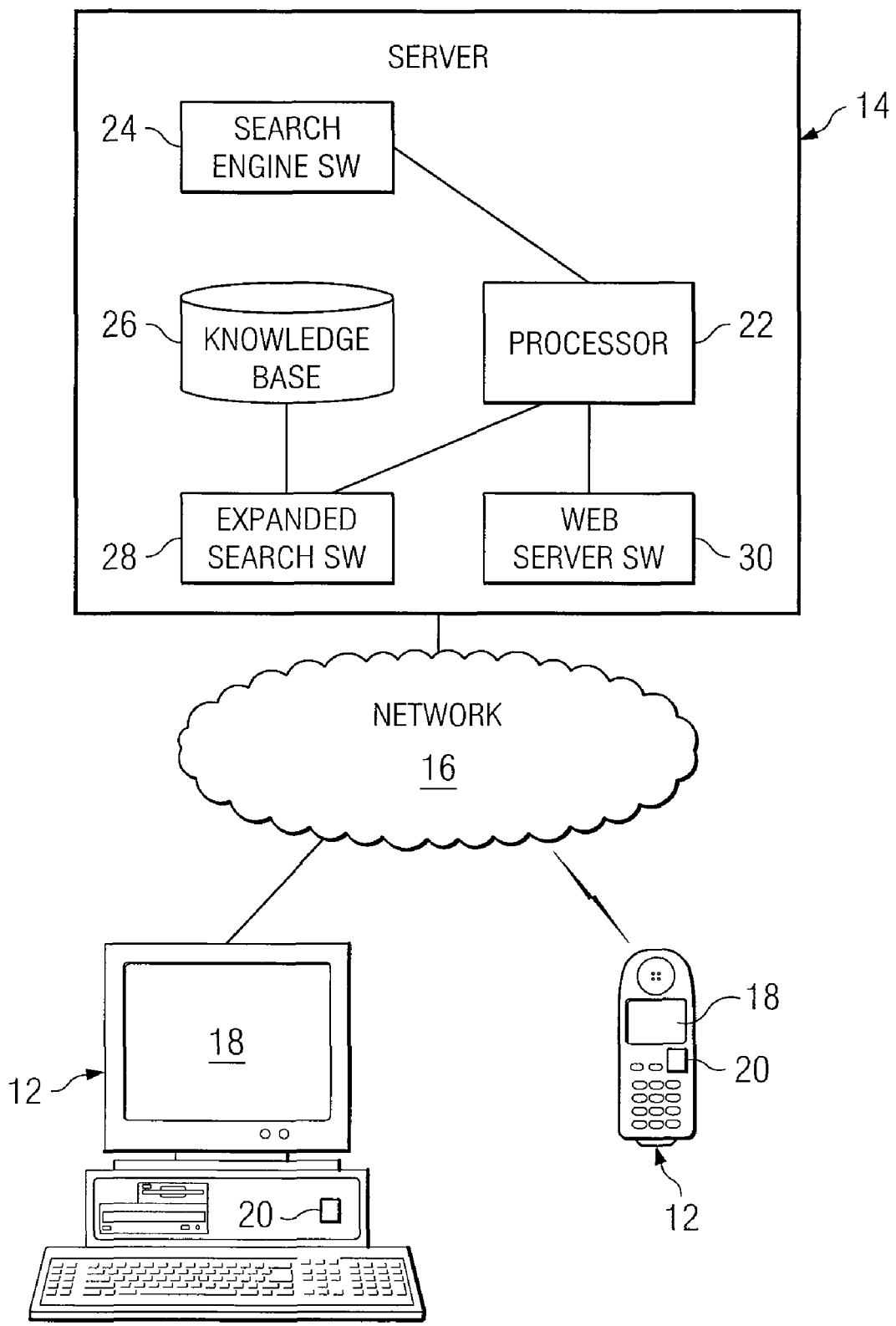
FIG. 1 illustrates one embodiment of a system that implements an expanded search and provides expanded search results.

FIG. 1 illustrates one embodiment of a system that implements an expanded search and provides expanded search results. An expanded search represents an expansion of a search into several related queries. The expanded search results of the different queries are displayed simultaneously. Search results represent a collection of information containers and/or pointers to information containers. The search results may be links to webpages or websites, documents or information from multiple documents, or any other suitable information. For example, a user initiates a search for a particular term or phrase (search query) in a particular corpus of information, such as the Web, a particular subject matter database, or an organization's database(s). The user receives search results from multiple, simultaneous searches based on expansions and/or refinements to the search query. For example, the search results may be based on expansions of the search query, such as subcategories of the query, senses of the query, and/or any other suitable expansion of the search query in any suitable variety of combinations. The search query or expansions may be further refined according to media types, sources, and/or any other suitable refinement in any suitable variety of combinations. Such expansions and refinements will be discussed in further detail below.

In the illustrated embodiment, system 10 includes clients 12, a server 14, and network 16. Network 16 facilitates communication between clients 12 and server 14. A client 12 may request information from server 14, and server 14 may provide results according to the request of client 12. Server 14 facilitates implementing the expanded search and presenting the expanded search results.

Client 12 represents any suitable component operable to communicate with server 14 using network 16. Client 12 may receive information according to a user input from server 14, and client 12 may provide that information from server 14 to the user. Client 12 may include a personal computer, a laptop, a wireless or cellular telephone, a personal digital assistant, or any other device suitable for communicating in system 10. In the illustrated embodiment, client 12 includes a graphical user interface ("GUI") 18 that displays information received from server 14 or network 16 to the user, and client 12 includes a web browser 20. In another embodiment, client 12 includes speakers to audibly convey search results to the user. Client 12 may provide the expanded search results graphically or audibly. If graphically presented, the search results may be presented in any suitable location in GUI 18 and may be presented either simultaneously or asynchronously. If audibly presented, the results may be presented asynchronously.

Web browser 20 represents an application that allows a user to interact with information located at a website, hosted by server 14 for example, by transmitting search queries and receiving search results. As an example, web browser 20 may include Microsoft Internet Explorer®, Mozilla Firefox®, Apple Safari™, or Opera®. With web browser 20, a user may initiate a search for information related to a topic by accessing a search page provided by server 14. Using server 14, as described in more detail below, the results are retrieved. When client 12 receives the results related to the search, web browser 20 displays the information to the user in a GUI 18. The results may be presented in different modules, as will be discussed with respect to FIGS. 2-4.

Server 14 represents any suitable component operable to communicate with clients 12 over network 16 and provide information to clients 12. Server 14 receives a request from client 12 and communicates information to client 12 in response to a request. Server 14 may include an e-mail server, a file server, a web server, a network server, any suitable remote server, or any other suitable device operable to service clients 12. For example, if server 14 is a web server, server 14 may receive Hypertext Transfer Protocol ("HTTP") requests for one or more webpages from clients 12 and transmit HTTP responses and data content to clients 12 according to the requests. In the illustrated embodiment, server 14 includes a processor 22, search engine software 24, a knowledge base 26, expanded search software 28, and web server software 30. Server 14 may include additional components, fewer components, or any suitable combination of components. For example, server 14 may represent a local area network server and may not include web server software 30. The functions of server 14 may be distributed among multiple servers 14 or other components in system 10, and system 10 may include any suitable number of servers 14.

Processor 22 represents any suitable component operable to facilitate operation of server 14 by processing information, executing software, logic, or code, or any other suitable function. Processor 22 includes any hardware, firmware, software, or a combination thereof that operate to control and process information.

For example, processor 22 executes expanded search software 28 to implement an expanded search, which improves the quality of the search results provided to client 12 and decreases the inefficiency of the searching process. As another example, processor 22 executes web server software 30 to communicate the expanded search results to client 12. Processor 22 may be a programmable logic device, a microcontroller, a microprocessor, any suitable processing device, or any combination of the preceding.

Search engine software 24 represents any suitable set of instructions, logic, or code embodied in a computer-readable medium and operable to search information to generate search results according to a search query. Search engine software 24 may include any suitable searching algorithm or technology to retrieve the search results. Any suitable component within system 10 may include search engine software 24. For example, search engine software 24 may be a third party's software, such as Google®, Yahoo®, or other Internet search engines. As another example, a server on an enterprise network may include search engine software 24 that generates search results from information available on the enterprise network. As yet another example, client 12 may include search engine software 24 that generates search results from information available on client 12.

Knowledge base 26 represents any suitable database or other source of structured information. Knowledge base 26 may represent a static or dynamic database. As an example, knowledge base 26 may represent a database of information or represent access to Wikipedia®, WhatIs.com®, or any other suitable collection of information. Knowledge base 26 may represent information externally accessible, such as information accessible through processing of portions of the Web or any other suitable external information. In another embodiment, knowledge base 26 may represent information internally retained in server 14. Knowledge base 26 may contain information gathered by generating ontologies as described in: Automatic Generation of Ontologies Using Word Affinities (U.S. Ser. No. 12/242,950; filing date Oct. 1, 2008), Identifying Clusters of Words According to Word Affinities (U.S. Ser. No. 12/242,957; filing date Oct. 1, 2008), Automatically Generating a Hierarchy of Terms (U.S. Ser. No. 12/242,965; filing date Oct. 1, 2008), and Selecting Tags for a Document by Analyzing Paragraphs of the Document (U.S. Ser. No. 12/242,984; filing date Oct. 1, 2008). Knowledge base 26 includes any suitable information to facilitate expansion and/or refinement of an initial search query. For example, knowledge base 26 includes various subcategories related to a search query. As another example, knowledge base 26 includes various senses related to the search query. Any suitable component within system 10 may include knowledge base 26 or knowledge base 26 may be a standalone component.

Expanded search software 28 represents any suitable set of instructions, logic, or code embodied in a computer-readable medium and operable to expand a search query and provide expanded search results. For example, expanded search software 28 expands a single search query, of one or more terms, into several related queries and provides the results of the different queries for simultaneous display. Expanded search software 28 may facilitate evaluation and organization of any suitable collection of information, such as webpages, documents, e-mails, calendar events, or any other suitable information. In an embodiment, expanded search software 28 accesses knowledge base 26 to determine how to expand and/or refine the initial search query and generates multiple search queries based on the information in knowledge base 26. For example, expanded search software 28 accesses knowledge base 26 to determine subcategories of the initial search query. Expanded search software 28 then generates multiple, expanded search queries based on the initial search query and each subcategory and runs each expanded search query through search engine software 24.

Web server software 30 represents any suitable set of instructions, logic, or code embodied in a computer-readable medium and operable to communicate search results to client 12. For example, web server software 30 communicates the results as a webpage to web browser 20. In this example, web server software 30 may communicate the results using HTTP. In other embodiments, web server software 30 may communicate using File Transfer Protocol or any other suitable protocol.

Network 16 represents any suitable network operable to facilitate communication between clients 12 and server 14. Network 16 may include a private network, a public network, an enterprise network, the Internet, a local area network, a wide area network, and/or any suitable network or combination of networks operable to facilitate communication between components.

In an exemplary embodiment of operation, a user requests access to a search page and server 14 transmits the search page to client 12. A user requests information from server 14 by inputting a single search query in the search page on client 12 and sending the query to server 14. Server 14 receives the search query. Expanded search software 28 determines a type of expansion to apply to the search query and generates multiple search queries based on the determined expansion type, as described below. To generate the multiple search queries, expanded search software 28 may access knowledge base 26. Using knowledge base 26, expanded search software determines how to expand the initial search query into multiple search queries. Server 14 executes search engine software 24 to search a relevant collection of information, such as web pages, based on the multiple, expanded search queries provided by expanded search software 28. Specifically, search engine software 24 may execute separate, simultaneous searches on the expanded search queries and may obtain search results for each expanded search query. Upon receiving the search results from the multiple searches, expanded search software 28 organizes the results for presentation. The results may be organized in any suitable way for presentation of the expanded search results to the user. For example, the results of each query may be presented in a separate module in a single web page. Web server software 30 communicates the organized search results to client 12. The separate modules of search results are displayed to the user in GUI 18 of client 12.

The expanded search queries may be based on any suitable type of expansion as determined by expanded search software 28. Expansions represent any suitable development of the initial search query using any suitable knowledge base 26, such as a Wikipedia® web page or any other suitable external collection of information.

The expansions may include subcategories of the initial search query, senses of the initial search query, or any suitable type of expansion. For example, a subcategory of the initial search query represents a semantically related, but typically subordinate, search. One or more subcategories of the initial search query may be presented. For each subcategory, one or more search results are also presented. If "car" is the initial search query, then the expanded search queries may include subcategories related to car, such as history, safety, design, economics, technology, and any other suitable subcategory as identified in knowledge base 28. Expanded search software 28 may use any suitable technique to determine the subcategories of the initial search query. For example, if expanded search software 28 accesses a Wikipedia® web page, expanded search software 28 may use any suitable information on the Wikipedia® web page to determine the subcategories of the initial search query, such as the topics in the contents section of the Wikipedia® web page. For the above example, history, safety, design, economics, and technology represent a few examples of topics in the contents section of the Wikipedia® web page for "car." Expanded search software 28 may also use ontologies generated according to incorporated applications to determine subcategories of the initial search query.

As another example, a sense of the initial search query represents a different use of a word. For each sense, multiple, expanded search queries are executed and one or more search results for each expanded search query are presented. If "tree" is the initial search query, then the expanded search queries may include the senses of "tree" as used in botany, computer science, and genealogy. Expanded search software 28 may use any suitable technique to determine the senses of the initial search query. For example, if expanded search software 28 accesses a Wikipedia® web page, expanded search software 28 may use any suitable information on the Wikipedia® web page to determine the senses of the initial search query. For the above example, botany, computer science, and genealogy represent a few examples of the disambiguation of "tree" available on the Wikipedia® web page. Expanded search software 28 may also use ontologies generated according to incorporated applications to determine senses of the initial search query. Expanded search software 28 may also use tag creation as described in: Selecting Tags for a Document by Analyzing Paragraphs of the Document (U.S. Ser. No. 12/242,984; filing date Oct. 1, 2008) and Recommending Terms to Specify Ontology Space (U.S. Ser. No. 12/243,050; filing date Oct. 1, 2008).

The expanded search queries may be further refined based on any suitable type of refinement as determined by expanded search software 28. Refinements represent additional honing of the expanded search query using any suitable knowledge base 26.

Refinements of the expanded search queries may be based on media types, sources, advertisements, and/or any other suitable refinement and in any suitable combination. Media types may represent types of content or may represent different types of a user experience. For example, the expanded search queries may be limited according to the media type. Therefore, the search results for each expanded search query may be presented as one or more particular media types. If "music" is the initial search query, the expanded search queries may be limited to webpages, images, videos, audio files, or any other suitable media type. Sources may represent the origin of the search result. In this example, the expanded search queries may be limited based on the source, and therefore, the expanded search results are presented from one or more particular sources. The different sources may include different sources of web content, such as various dictionaries, various sources of medical information, various newspapers with different points of view, websites from competing political candidates, or any other suitable source. Advertisements may represent a promotion related to the expanded search queries. The advertisements may be presented with the expanded search results, and the advertisements may be geographically clustered with the expanded search results when presented.

Expansions and refinements may be combined in any suitable manner. For example, an initial search query may be expanded based on different subcategories and further refined to present the expanded search results as an images media type. As another example, an initial search query may be expanded based on different senses and further refined to present the expanded search results in a webpages media type.

The expansions and/or refinements to apply to the initial search query may be determined at any suitable time. For example, a user may configure expanded search software 28, before the search is initiated, to apply a particular expansion to the search query. As another example, a user may configure expanded search software 28 when the search is initiated to apply a particular expansion. As yet another example, expanded search software 28 may determine what expansion type to apply to the initial search query based on information in knowledge base 26.

Expanded search software 28 may use any suitable condition to determine the type of expansion and/or type of refinement to apply the initial search query and may determine to consult more than one knowledge base 26 and/or different types of knowledge bases 26. For example, expanded search software 28 may access additional or other knowledge bases 26, which are available in any suitable component in system 10, for generating multiple expanded search queries. Several knowledge bases 26 may be searched for completeness. Expanded search software 28 may search multiple knowledge bases 26 to determine the dominant expansions. As another example, expanded search software 28 may change the expansion and/or refinement applied to the search query at any suitable time. If the subcategory expansion is applied to a search query initially, the sense expansion may also be applied to the search query and expanded searches using both expansion types may be conducted and presented simultaneously to the user. As yet another example, expanded search software 28 may combine expansions under any suitable circumstance. If the number of senses or subcategories is not as large as desired, the expansions may be combined to present a full cross-section of results to the user. Expansions may be combined for completeness. As yet another example, expanded search software 28 may consult and combine knowledge bases 26 derived from different media types. For instance, a knowledge base 26 may be formed by collecting and processing tags from image databases. As another example, expanded search software 28 may consult a knowledge base 26 to understand the user presenting the initial search query, which may further help expand and/or refine the search query.

In another exemplary embodiment of operation, a user may request a further expansion of one of the expanded search queries. Unlike traditional relevance feedback approaches where a user selects a search result, a user selects a subcategory of an expanded search derived from knowledge base 26 to further expand. In this embodiment, server 14 receives an expanded search query from client 12 to further expand and/or refine. Expanded search software 28 determines a type of expansion to apply to the already expanded search query and generates multiple search queries based on the determined expansion type, as described above. Server 14 executes search engine software 24 to search a relevant collection of information, such as web pages, based on the multiple, expanded search queries provided by expanded search software 28. Specifically, search engine software 24 may execute separate, simultaneous searches on the expanded search queries and may obtain search results for each expanded search query. Upon receiving the search results from the multiple searches, expanded search software 28 organizes the results for presentation. The results may be organized in any suitable way for presentation of the expanded search results to the user. For example, the results of each query may be presented in a separate module in a single web page. Web server software 30 communicates the organized search results to client 12. The separate modules of search results are displayed to the user in GUI 18 of client 12.

The further expansion of an expanded search query may be based on any suitable type of expansion as determined by expanded search software 28. Expansions represent any suitable development of the expanded search query using any suitable knowledge base, such as a Wikipedia® web page or any other suitable external collection of information.

The expansions may include subcategories of the expanded search query. For example, a subcategory of the expanded search query represents a semantically related, but typically subordinate, search. One or more subcategories of the expanded search query may be presented. For each subcategory, one or more search results are also presented. If "sushi" is an initial search query, "sushi ingredients" may represent a subcategory of "sushi." A user may further expand "sushi ingredients" as an expanded search query. The further expansion of "sushi ingredients" may include the following as subcategories: omelette, sushi rice, toppings and fillings, nori, and condiments. So for this example, the expanded searches may include "sushi ingredients omelette," "sushi ingredients sushi rice," "sushi ingredients toppings and fillings," "sushi ingredients nori," and "sushi ingredients condiments." Expanded search software 28 may use any suitable technique to determine the subcategories of the expanded search query. For example, if expanded search software 28 accesses a Wikipedia® web page, expanded search software 28 may use any suitable information on the Wikipedia® web page to determine the subcategories of the expanded search query. For the above example, omelette, sushi rice, toppings and fillings, nori, and condiments represent examples of the contents related to "sushi ingredients" available on the "sushi" Wikipedia® web page. Expanded search software 28 may also use ontologies generated according to incorporated applications to determine subcategories of the expanded search query.

The expansion of an expanded search query may be further refined based on any suitable type of refinement as determined by expanded search software 28. Refinements represent additional honing of the expanded search query using any suitable knowledge base 26.

A component of system 10 may include an interface, logic, memory, and/or other suitable element. An interface receives input, sends output, processes the input and/or output, and/or performs other suitable operation. An interface may comprise hardware and/or software.

Logic performs the operation of the component, for example, logic executes instructions to generate output from input. Logic may include hardware, software, and/or other logic. Logic may be encoded in one or more tangible media, such as a computer readable medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to system 10 without departing from the scope of the invention. For example, client 12 may include expanded search software 28 instead of or in addition to server 14 to expand and manipulate the search results. As another example, system 10 may include any suitable number of clients 12 and server 14. The components of system 10 may be integrated or separated. Moreover, the operations of system 10 may be performed by more, fewer, or other components. Additionally, operations of system 10 may be performed using any suitable logic.

Figure 2:
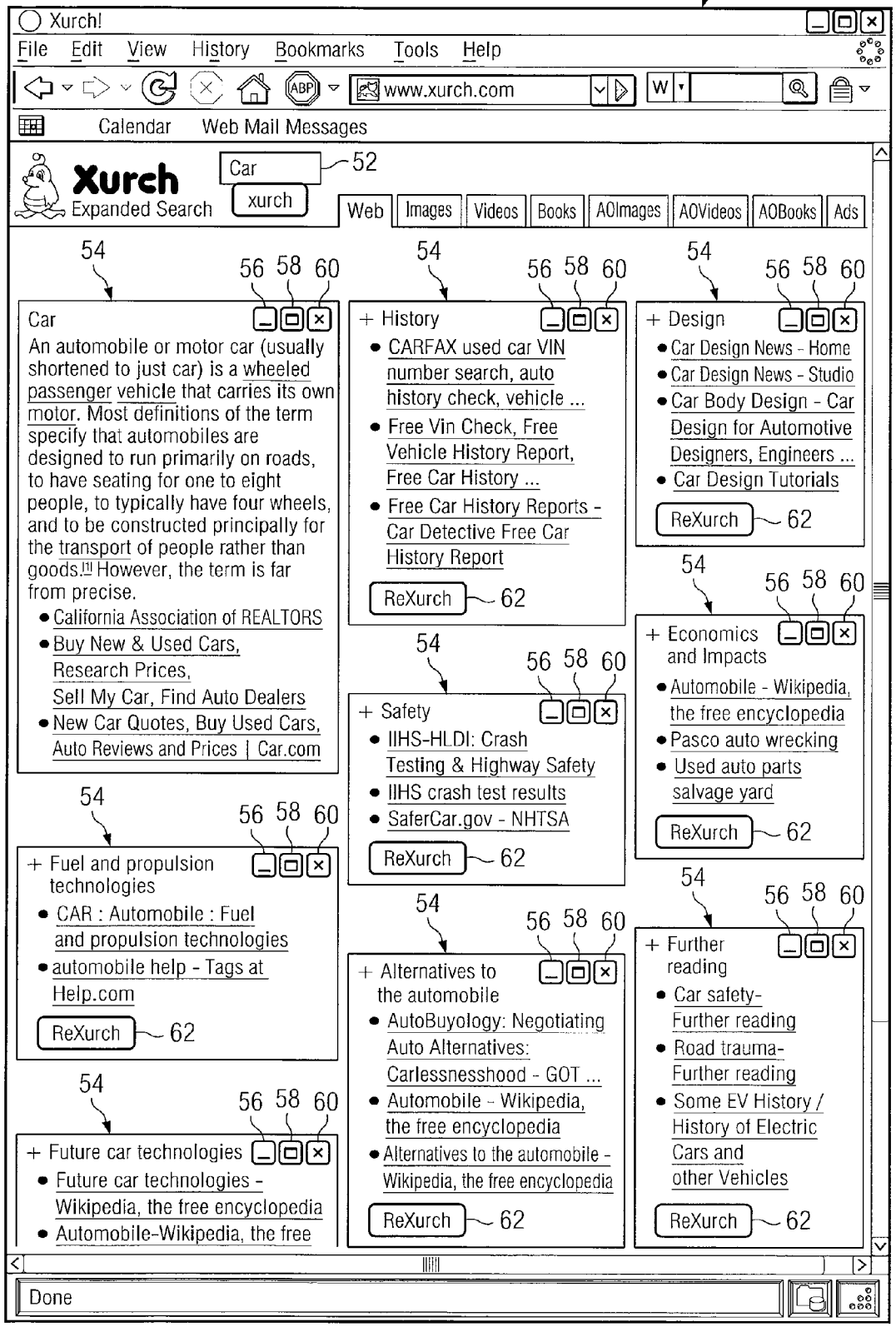
FIG. 2 illustrates an example of a graphical user interface that displays the expanded search results.

FIG. 2 illustrates an example of a GUI 18 that displays the expanded search results. In FIG. 2, GUI 18 displays the search results according to a combination of a subcategory expansion and a webpages media type refinement.

GUI 18 may be organized in any suitable manner to display the expanded search results. In the illustrated embodiment, GUI 18 includes a search field 52 and modules 54. A user may input a search query into search field 52 and initiate a search on that query. Module 54 represents a distinct geographical or temporal region of GUI 18 to group a set of results so the results may be perceived as a group. Each module 54 includes a separate expansion related to the search query and displays search results associated with the expansion.

Each module 54 may include a link to each result of the expansion, a minimize icon 56, a maximize icon 58, an exit icon 60, and a reXurch button 62. Minimize icon 56 allows a user to make module 54 smaller from its previous size, and maximize icon 58 allows a user to make module 54 larger from its previous size. When a module 54 is maximized, additional results of the expansion may be displayed or additional details about the results may be displayed. Exit icon 60 allows a user to remove module 54 from GUI 18. ReXurch button 62 represents any suitable button or link that allows a user to further expand a subcategory of an expanded search, as discussed in FIG. 5.

GUI 18 may present the results in any suitable manner. For example, GUI 18 may display the results simultaneously. The results are gathered and may be displayed on GUI 18 when all the results are retrieved. As another example, GUI 18 may present the results asynchronously. GUI 18 may present the results as search engine software 24 retrieves information rather than waiting for all results to be retrieved. GUI 18 may allow a user to scroll between modules 54, automate the appearance of a module 54 on GUI 18 and switch to another module 54 after a period of time, or support any suitable asynchronous presentation.

In the illustrated embodiment, a user enters the term "car" into search field 52 and initiates a search. As discussed with respect to FIG. 1, results are retrieved for the search query from server 14. Using expanded search software 28, the search results are organized for presentation to the user. Each expansion of the search query is displayed in a separate module 54 and the search query appears in a module 54. In the illustrated embodiment, expanded search software 28 has applied the subcategory expansion and the webpages media type refinement to the search query. Therefore, subcategories of "car" are displayed in modules 54 and the search results related to each subcategory are displayed as links to webpages. For example, there are separate modules 54 for: car, fuel propulsion technologies, future car technologies, history, safety, alternatives to the automobile, design, economics and impacts, and further reading.

Modifications, additions, or omissions may be made to GUI 18. For example, search field 52 and modules 54 may be organized in any suitable manner on GUI 18. As another example, an advanced search option may be available on GUI 18 for web browser 20 to extract more relevant results. The advanced search option allows a user to enter one or more additional criteria in the search query to further limit the search results. The criteria included in the advanced search option may be applied before the search is initiated, after the search results are returned, or as a user preference. As yet another example, a user may implement an expanded search on an already expanded search query. Server 14 receives the expanded search query as the search query from client 12 and implements the above-described process on the expanded search.

Figure 3:
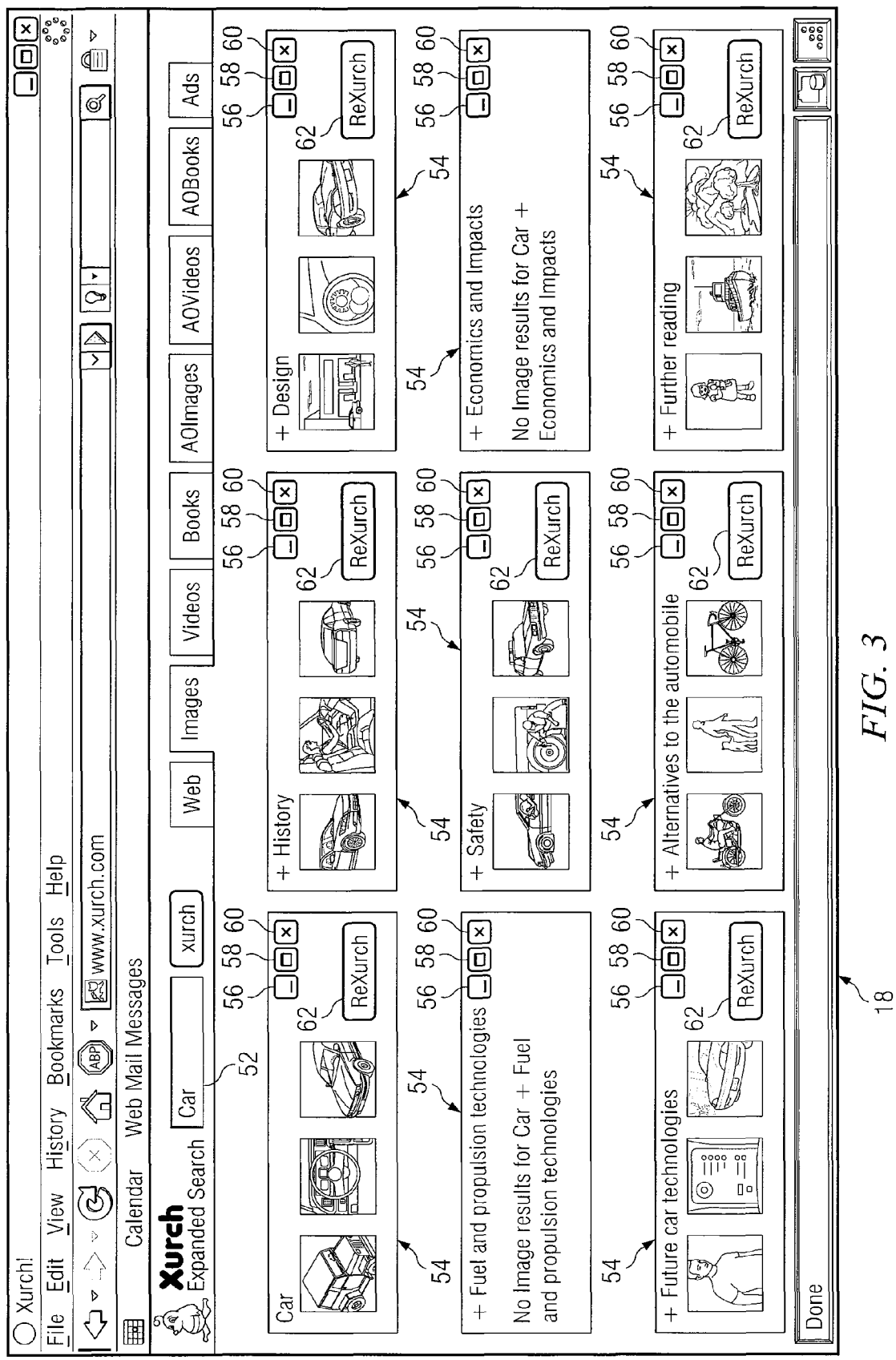
FIG. 3 illustrates another example of a graphical user interface that displays the expanded search results.

FIG. 3 illustrates another example of a GUI 18 that displays the expanded search results. In FIG. 3, GUI 18 displays the search results according to a combination of the subcategory expansion and an images media type refinement.

In the illustrated embodiment, a user enters the term "car" into search field 52 and initiates a search. As discussed in FIG. 1, results are retrieved for the search query from server 14. Using expanded search software 28, the search results are organized for presentation to the user. Each expansion of the search query is displayed in a separate module 54 and the search query appears in a module 54. In the illustrated embodiment, expanded search software 28 has applied the subcategory expansion and the images media type refinement to the search query. Therefore, subcategories of "car" are displayed in modules 54 and the search results related to each subcategory are displayed as images. For example, there are separate modules 54 for: car, fuel propulsion technologies, future car technologies, history, safety, alternatives to the automobile, design, economics and impacts, and further reading. Images are available for car, future car technologies, history, safety, alternatives to the automobile, design, and further reading.

Figure 4:
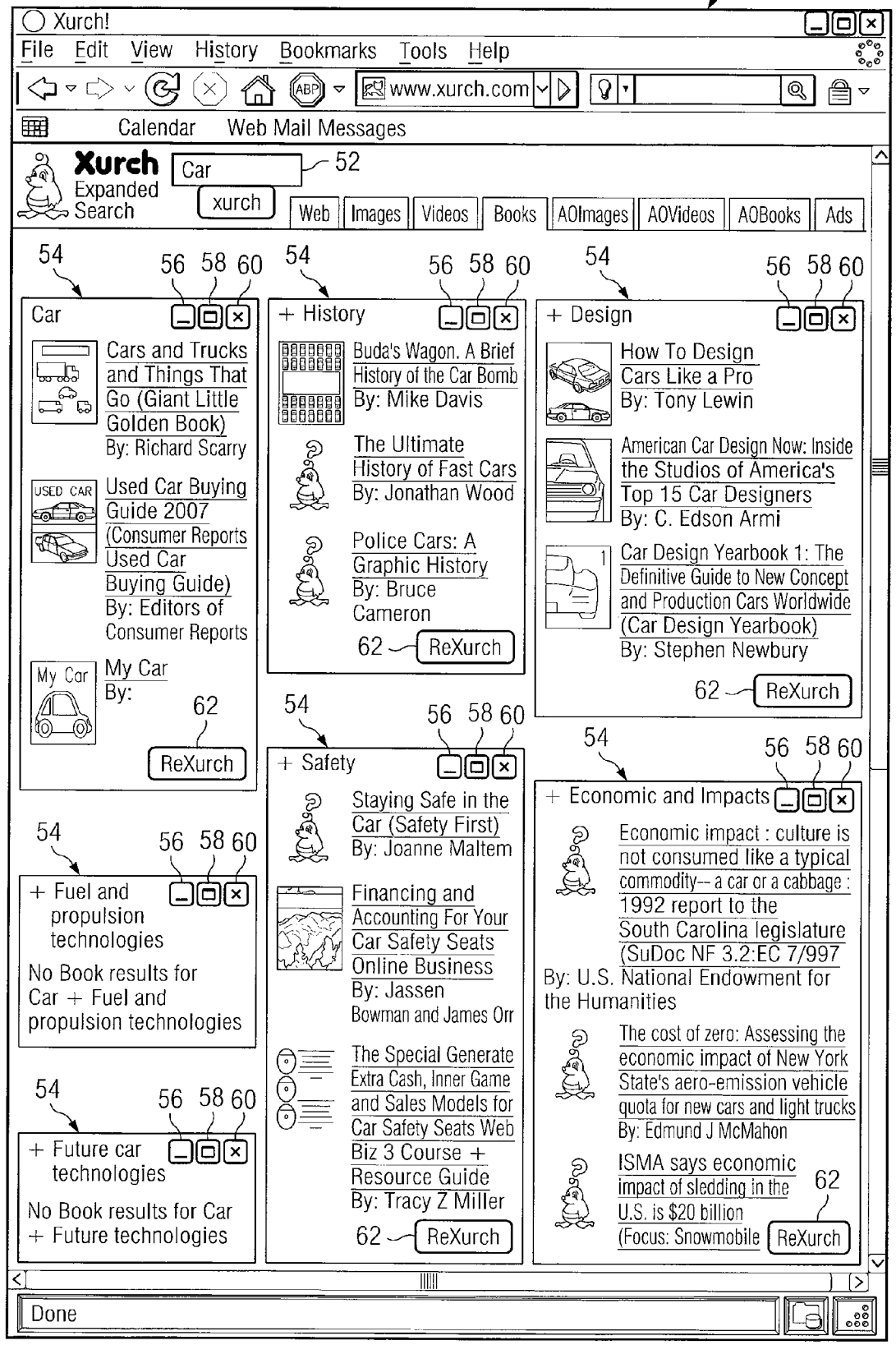
FIG. 4 illustrates yet another example of a graphical user interface that displays the expanded search results.

FIG. 4 illustrates yet another example of GUI 18 that displays the expanded search results. In FIG. 4, GUI 18 displays the search results according to a combination of the subcategory expansion, an images media type refinement, and a source refinement.

In the illustrated embodiment, a user enters the term "car" into search field 52 and initiates a search. As discussed in FIG. 1, results are retrieved for the search query from server 14. Using expanded search software 28, the search results are organized for presentation to the user. Each expansion of the search query is displayed in a separate module 54 and the search query appears in a module 54. In the illustrated embodiment, expanded search software 28 has applied the subcategory expansion, the images media type refinement, and the source refinement to the search query. The source category, in this example, is a source of web content related to books, such as Amazon®. Subcategories of "car" are displayed in modules 54 and the search results related to each subcategory are displayed as links to webpages and the associated thumbnails. For example, there are separate modules 54 for: car, fuel propulsion technologies, future car technologies, history, safety, alternatives to the automobile, design, economics and impacts, and further reading. There are links to webpages and thumbnails available for car, history, safety, design, and economics and impacts.

Figure 5:
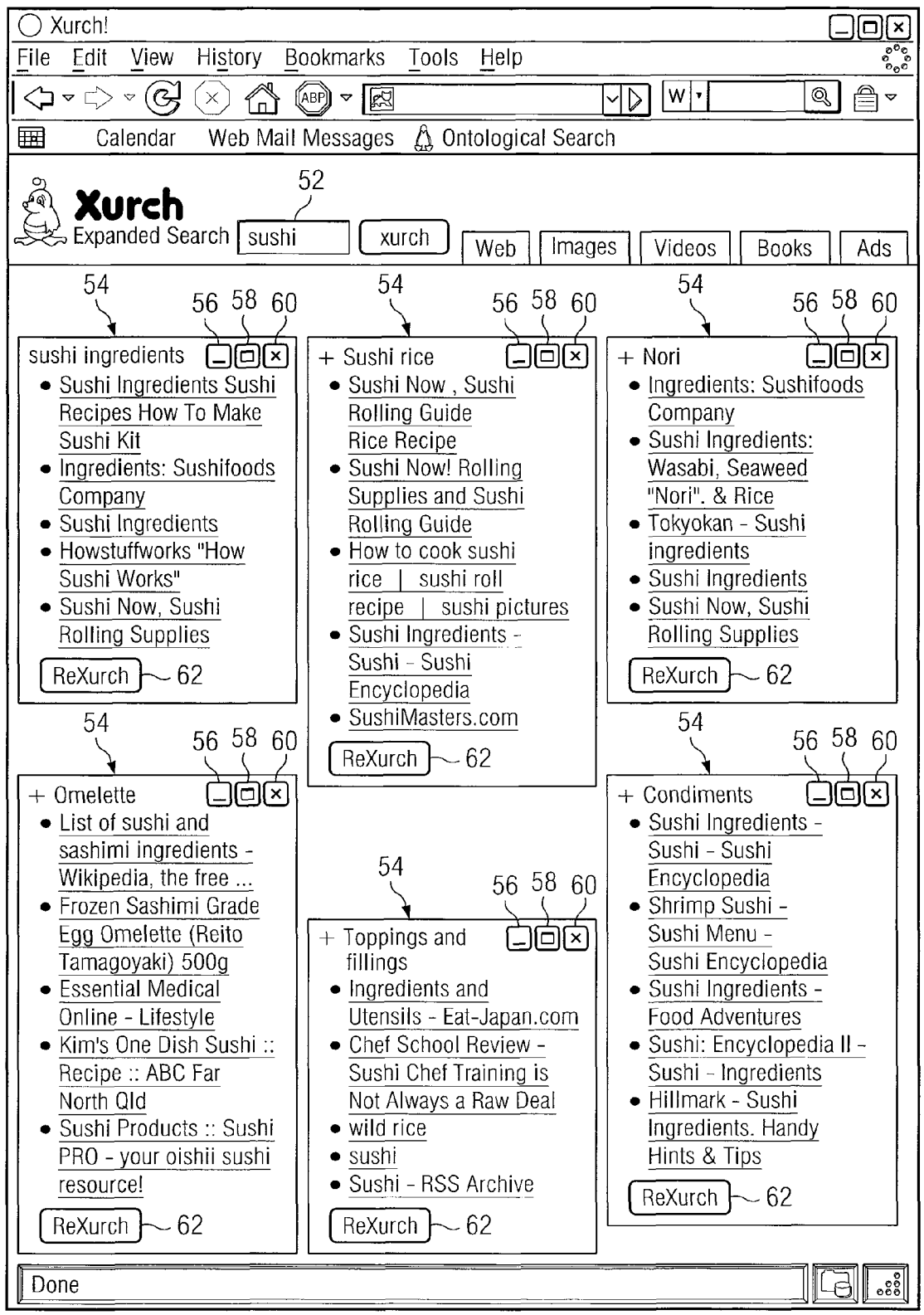
FIG. 5 illustrates an example of a graphical user interface that displays a further expansion of an expanded search result.

FIG. 5 illustrates an example of a GUI 18 that displays a further expansion of an expanded search result. In FIG. 5, GUI 18 displays the search results according to a combination of a subcategory expansion and a webpages media type refinement.

In the illustrated embodiment, expanded search software 28 ran an expanded search on the initial search query "sushi," as shown in search field 52. Expanded search software 28 returned "sushi ingredients" as a subcategory to "sushi" along with other subcategories related to "sushi." In this embodiment, a further expansion on "sushi ingredients" has been implemented, which initiates an expanded search of "sushi ingredients." A user may have depressed reXurch button 62 to implement the further expansion.

Expanded search software 28 initiates a search on the expanded search query, "sushi ingredients." As discussed with respect to FIG. 1, results are retrieved for the search query from server 14. Using expanded search software 28, the search results are organized for presentation to the user. Each expansion of the search query is displayed in a separate module 54 and the search query appears in a module 54. In the illustrated embodiment, expanded search software 28 has applied the subcategory expansion and the webpages media type refinement to the search query. Therefore, subcategories of "sushi ingredients" are displayed in modules 54 and the search results related to each subcategory are displayed as links to webpages. For example, the subcategories of "sushi ingredients" include omelette, sushi rice, toppings and fillings, nori, and condiments, which are each displayed in a module 54.

Figure 6:
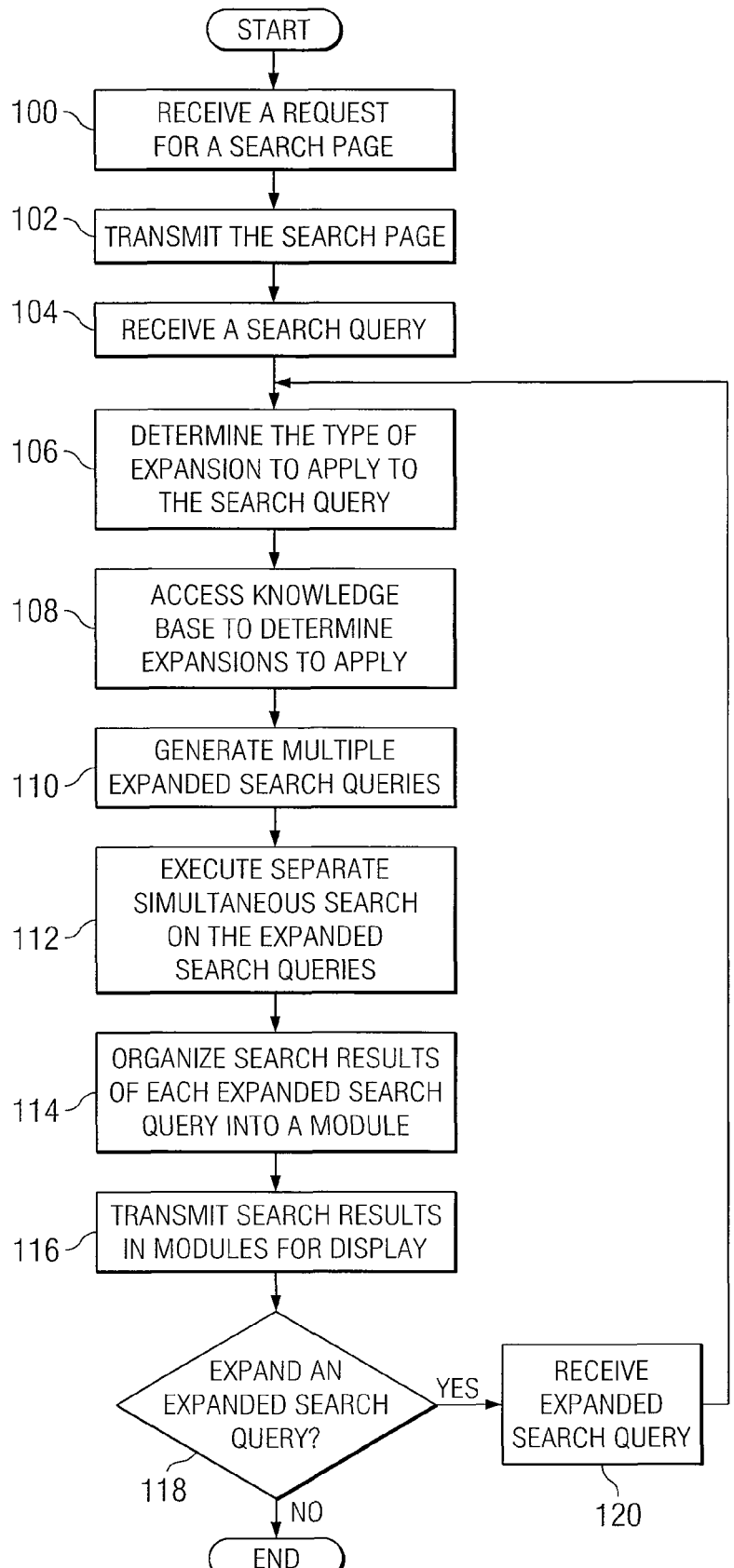
FIG. 6 illustrates one embodiment of a method for implementing an expanded search.

FIG. 6 illustrates one embodiment of a method for implementing an expanded search. The method starts at step 100 where server 14 receives a request for a search page from client 12. Server 14 transmits the search page to client 12 at step 102. Using the search page, a user may input a search query into client 12. Server 14 receives the search query from client 12 at step 104. The query may include any suitable combination of word(s), wildcard(s), or other suitable criteria to facilitate a search of information. As discussed above, the search query may include one or more additional criteria from an advanced search option to further improve the relevance of the search results.

Server 14 determines the type of expansions to apply to the search query at step 106. For example, server 14 executes expanded search software 28 to determine the type of expansion to apply to the search query. As discussed above, the expansion may include a subcategories expansion, a sense expansion, or any other suitable expansion according to the search query.

At step 108, expanded search software 28 accesses knowledge base 26 to determine the particular expansions of the determined expansion type. Expanded search software 28 generates expanded search queries according to the determined expansions at step 110. Search engine software 24 executes separate, simultaneous searches of the multiple search queries at step 112.

Expanded search software 28 organizes the search results of each expanded search query into a module at step 114. At step 116, web server software 30 transmits the search results in modules to client 12 for display.

A user may initiate an expanded search on one of the expanded search queries displayed in the module and determined from knowledge base 26. At step 118, server 14 determines whether to perform an expanded search on an expanded search query. If server 14 determines not to perform the search, the method ends. A user may submit another search query and the method would begin from step 100 again. If server 14 determines to perform the expanded search on the expanded search query, server 14 receives an expanded search query at step 120. The method continues from step 106 where server 14 determines the type of expansion to apply to the expanded search query.

Modifications, additions, or omissions may be made to the method. For example, if the search is an automatic search that client 12 performs locally, web server software 30 may not transmit the search results to client 12. As another example, any suitable component or any suitable portions of a component may perform the steps. The method may include more, fewer, or other steps. Additionally, the steps may be performed in any suitable order.

Certain embodiments of the invention may provide one or more technical advantages. A technical advantage of one embodiment may be that an expanded search is implemented when a simple search query is initiated. The expanded search improves the quality of the search results. By executing simultaneous searches, a user receives substantive results rather than having to repeat an iterative search process several times. The simultaneous searches reduce the need to iteratively redefine a search, which decreases the inefficiency of the searching process. Certain embodiments of the invention may include none, some, or all of the above technical advantages. One or more other technical advantages may be readily apparent to one skilled in the art from the figures, descriptions, and claims included herein.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A computer-implemented method, comprising:
    receiving, by one or more processors, a search query generated by a user;
    determining, by the one or more processors, a type of expansion to apply to the search query;
    automatically generating, by the one or more processors, a plurality of different expanded search queries according to the determined expansion type without intervention from the user;
    executing, by the one or more processors, a separate search on each one of the plurality of different expanded search queries to retrieve search results; and
    providing, by the one or more processors, the search results of the separate searches on each of the plurality of different expanded search queries for presentation to the user in a plurality of different modules, wherein each module comprises search results for one of the expanded search queries.

2. The method of claim 1, wherein executing a search on each one of the expanded search queries to retrieve search results comprises utilizing search engine software to retrieve the search results from a server.

3. The method of claim 1, wherein executing a search on each one of the expanded search queries comprises simultaneously executing the search on each one of the expanded search queries.

4. The method of claim 1, further comprising providing the expanded search queries for presentation to the user.

5. The method of claim 1, wherein the search results are provided to the user asynchronously.

6. The method of claim 1, further comprising graphically displaying the search results on a graphical user interface.

7. The method of claim 1, further comprising communicating the search results to the client for audible presentation.

8. The method of claim 1, further comprising audibly presenting the search results.

9. The method of claim 1, wherein the type of expansion is a selected one of a subcategory and a sense.

10. The method of claim 1, further comprising:
    determining a refinement to apply to the search query; and
    wherein generating expanded search queries comprises generating expanded search queries according to the determined expansion type and the determined refinement.

11. The method of claim 10, wherein the refinement is a selected one of a media type, a source, and an advertisement.

12. The method of claim 1, further comprising accessing a first knowledge base to determine particular expansions of the determined expansion type.

13. The method of claim 12, further comprising accessing a second knowledge base to determine particular expansions of the determined expansion type.

14. The method of claim 1, wherein the type of expansion is a subcategory and each of the expanded search queries comprises:
    the search query; and
    a subcategory of the search query.

15. A non-transitory computer readable medium encoded with logic, the logic when executed operable to:
    receive a search query generated by a user;
    determine a type of expansion to apply to the search query;
    automatically generate a plurality of different expanded search queries according to the determined expansion type without intervention from the user;
    execute a separate search on each one of the plurality of different expanded search queries to retrieve search results; and
    provide the search results of the separate searches on each of the plurality of different expanded search queries for presentation to the user in a plurality of different modules, wherein each module comprises search results for one of the expanded search queries.

16. The computer readable medium of claim 15, wherein executing a search on each one of the expanded search queries to retrieve search results comprises utilizing search engine software to retrieve the search results from a server.

17. The computer readable medium of claim 15, wherein executing a search on each one of the expanded search queries comprises simultaneously executing the search on each one of the expanded search queries.

18. The computer readable medium of claim 15, further operable to graphically display the search results on a graphical user interface.

19. The computer readable medium of claim 15, further operable to communicate the search results to the client for audible presentation.

20. The computer readable medium of claim 15, wherein the type of expansion is a selected one of a subcategory and a sense.

21. The computer readable medium of claim 15, further operable to:
   determine a refinement to apply to the search query; and
   wherein generating expanded search queries comprises generating expanded search queries according to the determined expansion type and the determined refinement.

22. The computer readable medium of claim 15, further operable to access a first knowledge base to determine particular expansions of the determined expansion type.

23. The computer readable medium of claim 15, wherein the type of expansion is a subcategory and each of the expanded search queries comprises:
   the search query; and
   a subcategory of the search query.

* * * * *